UNITED STATES PATENT OFFICE.

CHARLES WILLIAM DRURY, OF KINGSTON, ONTARIO, CANADA.

PROCESS OF TREATING FELDSPAR FOR USE AS A FERTILIZER.

1,150,815. Specification of Letters Patent. Patented Aug. 17, 1915.

No Drawing. Application filed December 28, 1914. Serial No. 879,393.

*To all whom it may concern:*

Be it known that I, CHARLES WILLIAM DRURY, a subject of the King of Great Britain, residing in the city of Kingston, in the county of Frontenac, Province of Ontario, Canada, have invented certain new and useful Improvements in Processes of Treating Feldspar for Use as a Fertilizer, of which the following is a specification.

Common or potash feldspar is a silicate of aluminum and potassium, and being insoluble in water or dilute acids is not available as a source of potash for fertilizers or other purposes without special treatment, and my object is to devise simple and cheap means for treating the feldspar to make it available for use as a constituent of fertilizers or for treatment for the recovery of the potash and alumina.

In the present known processes for the treatment of feldspar, the aim has been to obtain the potash content of the spar in the form of a sulfate or chlorid, either of which is readily soluble in water and is therefore recoverable by leaching. As the reagents necessary to convert the insoluble potash content of the spar into a soluble form are expensive, and as the whole of the potash is not rendered soluble, these processes are too expensive for commercial use on a large scale. I aim, therefore, not to obtain the potash as a chlorid or sulfate, but to so act on the spar that the resulting product though still a silicate or mixture of silicates, is readily decomposed by a dilute acid, or even by the acids of the soil.

I attain my object by heating the feldspar with calcium oxid (lime) or carbonate (limestone) and iron oxid (oxid ores). Some carbon in a suitable form is usually added, as ferric oxid is usually employed in the process and the carbon facilitates its change to ferrous oxid in which form iron usually enters a slag.

A blast furnace will usually be employed, in which case the fuel used in the furnace is sufficient to facilitate the reduction of the iron oxid from the ferric to the ferrous condition. The materials will usually be in the lump form and are suitably mixed together and with a proper proportion of coke before passing to the furnace. The resultant product, when a blast furnace is employed, is a silicious slag, which, when ground, is available for use in fertilizers or may be further treated to obtain its potash content. The product appears to be a mixture, or a solution in one another, of silicates of iron, calcium, potassium and aluminum, which, unlike the original double silicate, are readily decomposed by a ½% acid solution.

Using ordinary potash feldspar (orthoclase) with the formula $KAlSi_3O_8$ and containing approximately 65% silica, 18% alumina and 16% potassa, the following proportions are employed in the mixture:— feldspar, 50 parts by weight; cal. carb., (limestone,) 30 parts by weight, or cal. oxid, (lime,) 16.8 parts by weight, and iron oxid, (oxid ores,) 15 parts by weight. It must be understood, however, that the proportions will depend on the purity of the spar employed, the above being only a typical case, the point to be kept in mind being to use as nearly as possible just the right amount of iron oxid or calcium oxid or carbonate to obtain a fused or sintered product.

It will be noted that the spar, lime, and iron oxid are practically infusible separately, but when mixed in the proportion described a fused or sintered product is readily obtained.

In the reaction, calcium corbonate (limestone) and calcium oxid (lime) are, of course, chemical equivalents, as when heated the carbonate gives off carbon dioxid and the oxid remains.

It is to be understood that in the reaction, ferrous oxid may be added as such, or it may be the result of the reduction of ferric oxid to ferrous oxid.

The reaction, as far as I can at present determine, may be expressed by the following equations:—

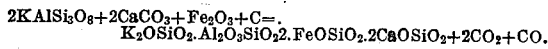

$$2KAlSi_3O_8 + 2CaCO_3 + Fe_2O_3 + C =$$
$$K_2OSiO_2.Al_2O_3SiO_22.FeOSiO_2.2CaOSiO_2 + 2CO_2 + CO.$$

This process is also applicable to the treatment of other potash bearing silicate rocks.

It should also be understood that it is not necessary to employ a high grade feldspar, as ordinary feldspathic rock which is more or less impure may be readily treated by my process.

What I claim as my invention is:—

1. A process of treating feldspar which consists in reacting on it with calcium oxid and ferrous oxid at a temperature of approximately 1200° C.

2. A process of treating feldspar which consists in fusing a mixture of feldspar, calcium oxid and ferrous oxid.

3. A process of treating feldspar which consists in fusing a mixture of feldspar, calcium oxid and ferrous oxid substantially in the following proportions by weight: 50 feldspar, 16.8 calcium oxid, 13.5 ferrous oxid.

4. A process of treating feldspar which consists in reacting on it with reagents capable of combining with silica to form a complex silicate insoluble in water but decomposable by weak acids and the potash thereby rendered available.

5. A new composition of matter resulting from the treatment of feldspar comprising substantially a mixture of potassium, aluminum, iron and calcium silicates, characterized by the fact that the potassium compound is decomposable by weak acids and the potash thereby rendered available.

6. A process of treating feldspar which consists in reacting on it with calcium oxid and iron oxid at a temperature of approximately 1200° C., in the presence of a reducing agent.

Signed at Kingston this 21st day of December 1914, in the presence of the two undersigned witnesses.

CHARLES WILLIAM DRURY.

Witnesses:
S. F. KIRKPATRICK,
J. C. GUILLIM.